United States Patent [19]
Gass

[11] Patent Number: 5,546,386
[45] Date of Patent: Aug. 13, 1996

[54] COMMUNICATION INSTALLATION CORE ASYNCHRONOUS SWITCHING NETWORK

[75] Inventor: Raymond Gass, Bolsenheim, France

[73] Assignee: Alcatel N.V., Amsterdam, Netherlands

[21] Appl. No.: 199,871

[22] Filed: Feb. 22, 1994

[30] Foreign Application Priority Data

Feb. 26, 1993 [FR] France ................... 93 02221

[51] Int. Cl.$^6$ ............................................. H04L 12/56
[52] U.S. Cl. ............................................. 370/60; 370/60.1
[58] Field of Search ................... 370/94.1, 60, 60.1, 370/94.3, 94.2, 13, 17, 58.1–58.3

[56] References Cited

U.S. PATENT DOCUMENTS

| | | | |
|---|---|---|---|
| 5,126,999 | 6/1992 | Munter et al. | 370/60 |
| 5,140,584 | 8/1992 | Suzuki | 370/94.1 |
| 5,179,556 | 1/1993 | Turner | 370/94.1 |
| 5,291,481 | 3/1994 | Doshi et al. | 370/60.1 |
| 5,313,454 | 5/1994 | Bustini et al. | 370/94.2 |

FOREIGN PATENT DOCUMENTS

0552794A2  7/1993  European Pat. Off. .

OTHER PUBLICATIONS

"Data and Computer Communication" By W. Stalling; pp. 436–437, 1988.

Primary Examiner—Douglas W. Olms
Assistant Examiner—Ajit Patel
Attorney, Agent, or Firm—Sughrue, Mion, Zinn, Macpeak & Seas

[57] ABSTRACT

An asynchronous switching network for a communication installation core including packet mode units directly or indirectly interconnected by identically designed and operated point-to-point links comprises a traffic control system including distributed access control arrangements in each packet mode unit to enable the unit to set the order of communication of packets sent to it by the other packet mode units according to constraints specific to it and imposed temporarily or permanently and/or constraints reported to it by the other units with which it communicates. Each transmission of a packet from a packet mode unit to another packet mode unit requires the sending of a request by the unit requiring to send to the unit with which it is required to communicate and the sending of an acquiescence in the reverse direction from the latter for each of the packet elements separately transmitted between the units.

8 Claims, 3 Drawing Sheets

COMMUNICATION INSTALLATION CORE ASYNCHRONOUS SWITCHING NETWORK

BACKGROUND OF THE INVENTION

1. Field of the Invention

The present invention concerns an asynchronous switching network for a communication installation including packet mode units and more particularly a traffic control system for a network of this kind.

2. Description of the Prior Art

French patent application FR-A-2 665 314 (corresponding to European Patent No. 0468442) describes an integrated services digital network communication installation or interconnect network by which the dedicated modular units constituting the core are connected by point-to-point links according to their communication requirements.

A network of this kind can incorporate an asynchronous subnetwork of packet mode units, i.e. the units within the core directly or indirectly involved in switching data packets.

These data packets are conventionally switched by centralized switches or by a distributed network formed by a bus or by a loop, each switch including a memory in which incoming packets are temporarily stored until they are forwarded to destinations depending on address information included in their respective header.

The switches include a plurality of inputs at which they can receive packets and the latter are switched to outputs corresponding to their respective destinations. Each output can therefore transmit a succession of packets which may reach it from different inputs, the order in which packets are transmitted from the same output being set by predetermined criteria including the arrival time and priority of each packet.

Packets awaiting transmission from an output are therefore temporarily stored in memory in the switch until they are transmitted. To the extent that the packet senders are independent of each other, the number of packets arriving at the various inputs and to be passed through an output of the switch can exceed the handling capacity of their output if no specific precautions are taken to prevent this. There is then the risk of packets being lost in the switches and losses can occur if a large number of asynchronous terminals attempt simultaneously to communicate with the same asynchronous server via the same port, for example.

Provisions are therefore made to reduce the risk of packet loss at the switches, there being a particularly high risk of packet loss from the memories in which the packets are temporarily stored. These memories are conventionally of the stack type and have a capacity limited for reasons of size and cost. A first way to limit the risk of packet loss is conventionally employed in large asynchronous networks and consists in having users served by switches in parallel so as to reduce the risk by spreading it. This first approach is generally associated with measures for limiting input traffic allowing for differences between predetermined traffic values and values reflecting the actual traffic. This entails the use of a set of means which it is usually not feasible to incorporate in private type installations, in particular for reasons of cost and suitability.

SUMMARY OF THE INVENTION

The invention therefore proposes a communication installation core asynchronous switching network comprising packet mode units directly or indirectly interconnected point-to-point by links identically designed and operated, comprising a traffic control system including distributed access control means in each packet mode unit to enable said unit to fix the order of communication of packets sent to it by the packet mode units according to constraints specific to it and imposed either temporarily or permanently and/or constraints reported to it by the other units with which it communicates, each transmission of a packet from a packet mode unit to another packet mode unit requiring the sending of a request by the unit requiring to send to the unit with which it requires to communicate and the sending of an acquiescence in the opposite direction by the latter for each of the packet elements separately transmitted between said units.

The invention, its features and its advantages are explained in the following description with reference to the figures described below.

DETAILED DESCRIPTION OF THE PREFERRED EMBODIMENT

Figure 1:
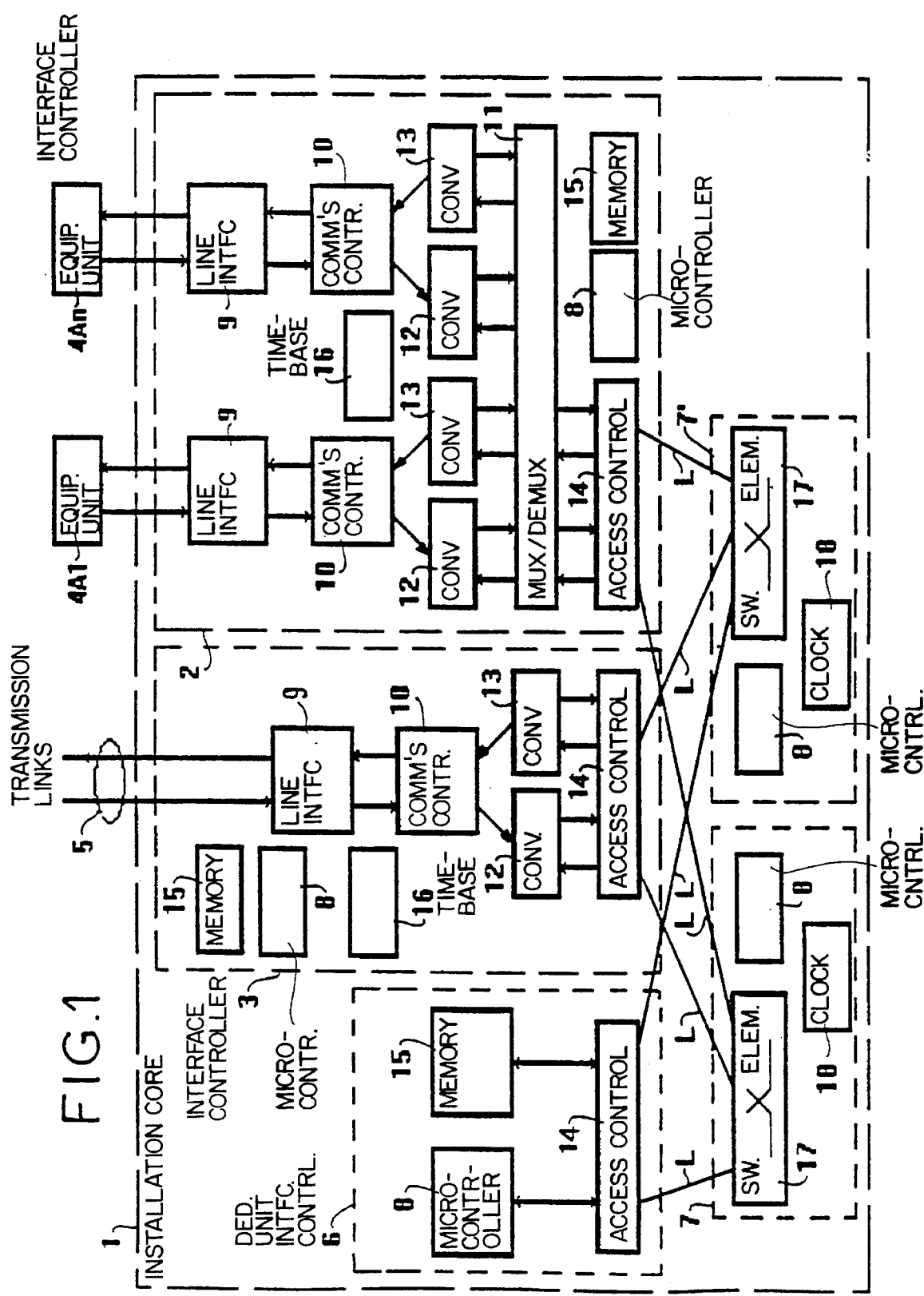
FIG. 1 is a block diagram of one example of an interconnect subnetwork between packet mode units of an integrated services digital network type communication installation.

The communication installation of which part is shown in FIG. 1 is preferably a multiservice digital installation of the type discussed in the document FR-A-2 665 314. It therefore comprises an installation core 1 made up of diverse units interconnected by point-to-point links specifically designed to meet the requirements of the units that they serve.

For example, these units are implemented on individual circuit boards to be grouped together within a common structure, usually of the cabinet or rack type, in which the core of the installation is located. The various circuit boards of an installation core are if possible interconnected by point-to-point links on a backplane circuit board to which the unit circuit boards connect at board positions (slots) including appropriate connection members.

As an alternative to this, a plurality of systems of the type considered here can be combined to constitute a greater capacity system, possibly located on the same site, the system being then able to use transmission links which are not part of the installation for communication between sites.

As mentioned above the point-to-point links of the installation core on a site are designed and/or operated according to the requirements of the units that they interconnect. The units of a core having the same requirements are interconnected by a network of identical links which are operated in exactly the same way, it being understood that the same unit may be served by point-to-point links that are not identical and/or not operated in exactly the same way if this is necessary to its operation.

A multiservice installation core may comprise a plurality of different interconnect subnetworks. Each of these subnetworks uses links designed and/or operated in a particular manner specific to it and differing from those for other subnetworks.

In the FIG. 1 example, the subnetwork concerned is that for interconnecting the packet mode units of the core 1 of the installation concerned. These units are directly or indirectly involved in the exchange of digital data grouped into packets and include interface controllers 2, 3 for connecting equipment units 4A1, 4An or transmission links 5 connecting the installation core 1 to other systems of the installation on different sites or to other installations, either directly or via at least one switching network to which the installation core 1 is connected by the transmission link or links concerned.

The interface controller 2 is an input/output interface controller, for example, serving equipment units 4A1, 4An using or supplying data adapted to communicate in packet mode such as telephones, terminals or any other asynchronous (usually ATM) equipment, for example an ATM server type equipment.

The interface controller 2 is supervised internally by a microcontroller 8 and an associated timebase 16 and includes a plurality of line interfaces 9 each serving an individual equipment unit 4A1 through 4An respectively connected to them by bidirectional links, usually wire, electrical or optical links. Each line interface 9 of the interface controller 2 is connected to a communication controller 10 adapted to manage exchanges of packets with the equipment unit to which it is connected. In this implementation each of the communication controllers 10 of the interface controller 2 is connected in parallel with the other communication controllers of the interface controller to a multiplexer-demultiplexer 11 via converter modules 12 and 13. Each converter module 12 individually encapsulates packets converted into standard type cells or cells that it receives from the equipment unit (e.g. equipment unit 4A1) or the link 5 it serves.

Each individual encapsulation produces an encapsulated cell combining with a received standard cell to be switched the routing parameters necessary for switching it in the dedicated asynchronous network interconnecting the packet mode units of the core 1. Each converter module 13 disencapsulates the encapsulated cells transmitted to it by the dedicated asynchronous network and addressed to an equipment unit or link as explained above. Each disencapsulation separates the fixed length (number of bits) element representing a standard cell from the additional bits that were combined with this standard cell by the converter module 12 which encapsulated it.

An access control circuit 14 is inserted between the multiplexer-demultiplexer 11 of the interface controller 2 and the links L which connect this interface controller to the other packet mode units of the installation core of which the interface controller 2 is part.

The access control circuit 14 manages the exchange of encapsulated cells with other packet mode units, all of which include an identical access control circuit. Execution of its tasks is supervised by the microcontroller 8 of the interface controller 2, an appropriate memory system 15 being associated with the microcontroller.

The interface controller 3 is an interface controller for bidirectional asynchronous transmission links, for example. The link 5 shown is, for example, an asynchronous link supporting a bit rate of 155 Mbit/s in each direction. The interface controller can instead be an interface controller providing access to a standard ETHERNET or token ring type local area network transmitting information in the form of digital data packets.

In the example shown diagrammatically in FIG. 1 the interface controller 3 includes a timebase 16, a microcontroller 8 with an associated memory system 15, a line interface 9 at which the transmission link 5 terminates, a communication controller 10 and two converter modules 12 and 13 directly interconnected to an access control circuit 14. These various components have substantially the same functions as in the interface controller 2.

The packet mode units can include dedicated unit interface controllers 6 which can be common to a plurality of subnetworks of the installation core, especially if the unit is a control or administration unit.

An interface controller 6 includes at least one microcontroller 8 associated with a read only and/or random access memory system 15, for example. It includes an access control circuit 14 for packet mode communication, in this example using encapsulated cells, with the other packet mode units of the installation core 1 of which it is part. As mentioned above, packet mode communications between these units use point-to-point links.

The installation core 1 packet network includes at least one and preferably two switching units 7, 7' to which all the packet mode units are connected by respective individual bidirectional links L which are identically designed and operated, as mentioned above; each link L is an asynchronous link supporting a bit rate of 155 Mbit/s in each direction, for example.

The switching units 7, 7' are based, for example, on broadband switching elements 17 as described in the article "Techniques large bande" ("Broadband techniques") published in volume 65, number 1 of the journal "Revue des Télécommunications Alcatel". A switching element 17 of this type carries out space-division switching of digital data organized into encapsulated cells and is conventionally supervised by logic incorporating a microcontroller 8 and a clock circuit 18 for generating clock signals and distributing them to the packet mode units via the links L which serve them.

Each encapsulated cell comprises a header element followed by a predetermined maximum integer number "m" of packet data transmission elements, each of these elements including the same number of bytes and being divided into a control field and a data field. Each element of a header contains data to be processed in order to route the encapsulated cell which contains it by the switching units 7 or 7' in the installation to which the encapsulated cell is routed, together with data for reconstituting the packet from which the cell is derived on completion of its transit within the installation.

This implies that any packet to be transmitted between units of an installation core packet subnetwork, as considered here, is divided into elements intended to constitute standard cells, which are transmitted individually after encapsulation, if the packet length exceeds the maximal length of the packet element provided per cell, and also implies that the units of the subnetwork can temporarily store the encapsulated cells of the packets being transmitted. It is therefore possible to interconnect any two packet mode units of the subnetwork via one or other of the switching units 7, 7', remembering that if one of the links L connecting a packet mode unit (the interface controller 3, for example) to one of the switching units (the switching unit 7, for example) is operating at its maximum throughput (155 Mbit/s in this example) this packet mode unit can still communicate within the packet subnetwork using the link L which connects it to the other switching network.

Transmission of encapsulated cells over the links L between packet mode units of the installation core 1 employs a procedure entailing the sending of a request from the unit requiring to send to the unit with which it requires to communicate and the sending of an acquiescence by the solicited unit.

This is to enable a solicited unit to operate on the stream of packet data addressed to it.

This action, which can be managed at a low level in the solicited unit, is modulated according to the processing capabilities of the unit and the priorities which it assumes, which change with time, especially when a plurality of units require to send to it.

Figure 2:
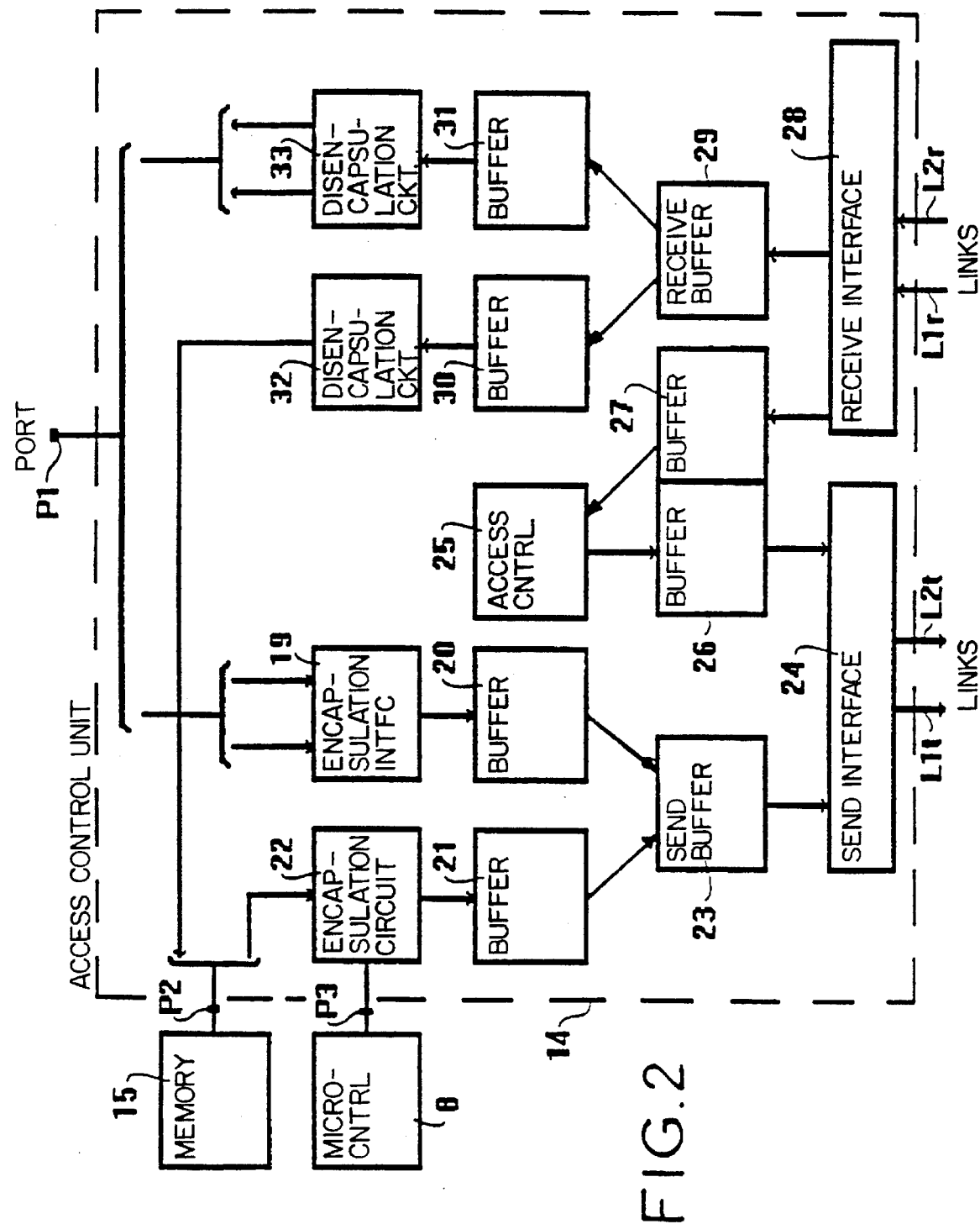
FIG. 2 is a block diagram of a packet mode unit access control circuit.

In the proposed implementation these actions are managed by the access control circuits 14 of the packet mode units 2, 3, 6. FIG. 2 shows one example of a circuit of this kind.

In the example shown there are two possible connections from the access control circuit to the interface controller serving it. One is intended to enable the transmission of cells already formatted in the standard form which are processed in "connected" mode and in respect to which there are relatively severe constraints in terms of transmission time. The other is to enable transmission of packets which have not been preformatted in the form of standard cells and which can be processed in "connectionless" mode in that their transmission is not subject to imperative transmission time constraints.

Accordingly different priorities are assigned to the two types of service offered at the level of the access control circuits 14.

The bidirectional transmission link 5 shown in FIG. 1 transmits encapsulated cells in "connected" mode to a port P1 (in this example a double port) of the access control circuit 2. "Connectionless" mode packets are exchanged via a port P2 with a memory 15 of the interface controller including the access control circuit 14 shown, for example in the context of exchanging files with a microcontroller memory of another interface controller, when there are no specific transmission time constraints.

As mentioned above, each packet supplied to an interface controller by an equipment unit (e.g. equipment unit 4A1) or by a transmission link (e.g. transmission link 5) is divided into successive fixed length elements, if required, each of these elements being destined to be incorporated into a standard cell, as defined above, for transmission in the installation core 1. This encapsulation is carried out in a dedicated interface 19 connected by the port P1 and a double link to the converter module(s) 12 of the interface controller concerned.

The succession of encapsulated cells obtained at the output of the encapsulation interface 19 of an interface controller is transmitted to a first buffer memory 20.

In the example under discussion where at least some of the interface controllers can transmit both encapsulated cells in "connected mode" and encapsulated cells in "connectionless" mode, and to the extent that it is necessary to be able to give the former priority over the latter, if required, there is a second buffer memory 21 for the succession of encapsulated cells to be transmitted which are derived from the packets transmitted in "connectionless" mode. These encapsulated or "connectionless" cells are produced by an encapsulation circuit 22 from digital data supplied in the same way as a normal file by an output buffer memory in the memory system 15. The microcontroller 8 associated with the memory system 15 supervises the process carried out by the encapsulation circuit 22, in particular to ensure that the data to enable reconstitution of the encapsulated information after transmission is added.

The encapsulated cells alternately transmitted by the two buffer memories 20 and 21 are stored according to their respective priorities in a send buffer memory 23 before they are sent via a send interface 24 on one or both of the outgoing point-to-point links L1t, L2t of the two links L connecting the interface controller in question to the switching units 7 and 7'.

In the proposed implementation the send interface 24 is under the control of an access controller which authorizes the sending of pending encapsulated cells by means of an outgoing link L1t or L2t of the links L according to the acquiescences transmitted by the respective incoming link L1r or L2r from the packet mode unit to which the pending encapsulated cells are addressed. A buffer memory 26 connects the access controller 25 to the send interface 24. It stores the requests and acquiescences pending sending by the links L1t and L2t to the destination packet mode units of the installation core 1.

The access controller 25 is connected by a buffer memory 27 to the output of a receive interface 28 at which terminate the two incoming links L1r and L2r which connect the interface controller in question to the two switching units 7 and 7' of the installation core 1 in order to act on the encapsulated cell header data relating to requests and acquiescences received by the access control circuit 14, this data being conventionally placed in a particular configuration in the sequence of data constituting each header.

A receive buffer memory 29 connected to the output of the receive interface 28 is provided to enable recovery of encapsulated cells received in order to disencapsulate the data that they contain. Accordingly it receives the encapsulated cells transmitted to this receive interface by the links L1r and L2r.

Two secondary buffer memories 30 and 31 are connected in parallel to gather selectively the encapsulated cells transmitted by the first receive buffer memory 29 according to the header data of each of the encapsulated cells, given that this data specifies the destination of the data following the header data in the cell.

The encapsulated cells containing "connectionless" mode packet data are therefore switched to the secondary buffet memory 30 while those containing "connected" mode packet data are sent to the secondary buffer memory 31.

A disencapsulation circuit 32 is inserted between the port P2 of the access control circuit 14 in question and the secondary buffer memory 30 of the latter. It reconstitutes each packet from the data contained in the encapsulated cells marked as having been used to transmit the packet, which corresponds to a file, for example, to enable transmission of the reconstituted information. This transmission is from the disencapsulation circuit 32 to a memory of the associated system 15, for example, the data being formatted in a manner enabling its transmission in a form accepted by this memory.

A disencapsulation interface 33 is placed at the output of the secondary buffer memory 31 and at the input of the port P1 to serve the converter module(s) 13 of the interface controller through two outgoing links. It has roughly the same function in relation to these modules as the disencapsulation circuit 32 has in relation to the destination memory. Specifically, it restores successive fixed length elements from which each packet transmitted in the form of cells can be reconstituted.

As stated above, any packet mode unit requiring to send must first send a request to the unit with which it requires to communicate. This request is contained in a specific header element of an encapsulated cell which is transmitted by the access control circuit 14 of the unit in question via at least one of the two links L1t, L2t enabling this circuit to communicate with the access control circuits 14 of the other units through one or other of the switching units 7, 7'. Each switching unit routes any encapsulated cell that it receives to the destination unit designated in the respective header, via the link L1r or L2r connecting it to that destination unit, if necessary after eliminating the routing data which it needed and which is no longer of any utility.

The destination unit, with which a plurality of other units require to communicate, receives the requests which are individually produced by these units and which are transmitted to it via the links L1r and L2r of its access control circuit 14 in order for the requests to be processed by the access controller 25 in this access control circuit.

It settles for itself contention between these units requiring to communicate and designates that which is temporarily to send by sending it an acquiescence. Each unit has access control means enabling it to select the units to which it successively sends acquiescences. These selections are conditioned by constraints imposed on it, especially by the "connected" mode packet traffic, constraints which are specific to it on a permanent and/or temporary basis, and constraints associated with other packet mode units with which it actually communicates.

Each acquiescence is transmitted to the selected unit requiring to send in the form of a specific encapsulated cell header element addressed to that unit by the unit with which it requires to communicate.

To the extent that the same unit is frequently liable to require to send a plurality of successively encapsulated cells to the same other destination unit and the specific elements characteristic of requests and acquiescences are systematically in the capsule header, there is provision for sending the requests which are individually required for transmitting cells in succession from one unit to another in the header of the encapsulated cells whose acquiescence has been received. An encapsulated cell transmitted in the context of any succession can then contain a request intended to enable sending of one of the encapsulated cells following it for which an acquiescence has yet to be received.

The same goes for requests from one unit to another which can also be sent successively, each in one of the encapsulated cells to be sent for which acquiescences have been received.

Figure 3:
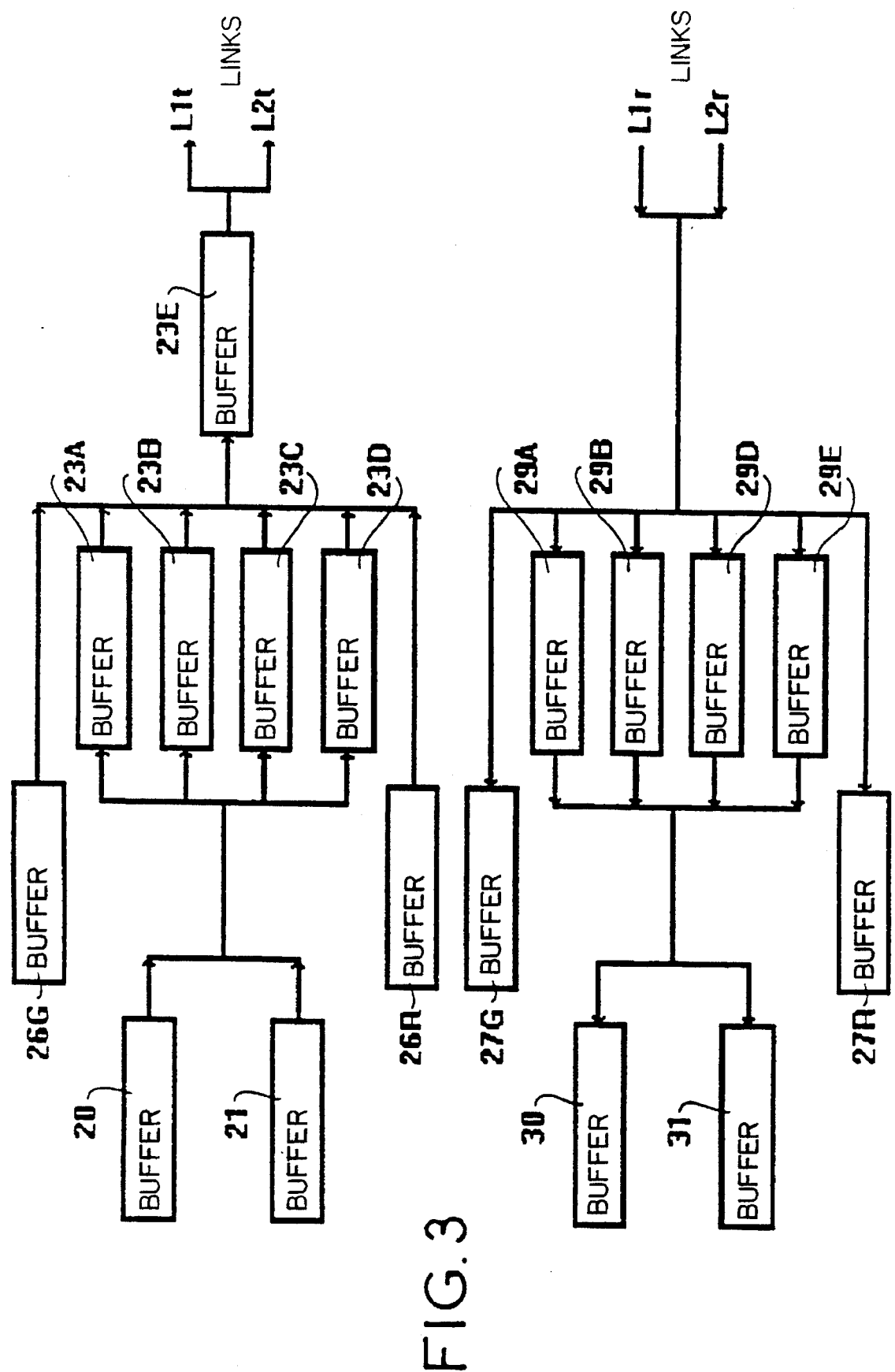
FIG. 3 is a block diagram of an exchange arrangement for an access control circuit as shown in FIG. 2.

FIG. 3 shows the organization of the information traffic control system at the level of an access control circuit 14 in a packet subnetwork of an installation core by exchange of requests and acquiescences between the communicating packet mode units.

As mentioned above, any packet mode unit having data to transmit in the form of cells to another unit of the packet subnetwork sends a request to that destination unit, a priority level indication is associated with said request and said level depends among other things on the "connected" or "connectionless" traffic mode relevant to each cell, the "connected" mode packet encapsulated cells having the highest priority level.

This explains the presence of the two parallel buffer memories 20 and 21 in which are respectively stacked the encapsulated cells containing "connected" mode packet elements (buffer memory 20) and the other encapsulated cells due to the "connectionless" traffic (buffer memory 21).

The sending of an encapsulated cell by the access control circuit 14 of a packet mode unit to another unit of the installation core 1 entails first sending a request to the destination unit, as soon as this is possible. Requests awaiting sending in an access control circuit 14 are stored in a buffer module 26G (FIG. 3) of the send buffer memory 26 before being sent over one or both of the links L1t and L2t to the switching units responsible for routing them.

The access controller 25 associates a priority level indication with each request. This level is higher for "connected" mode packet cells stored in the buffer memory 20, varies and increases with the duration for which the encapsulated cells have been stored in the buffer memory 21. To this end increasingly higher priority levels are assigned to the requests produced as cells are stacked in the buffer memory 21 so that a relative congestion indication can be sent from the requesting unit to the destination unit.

In a preferred implementation the requests which are sent before the encapsulated cells they concern are transmitted in the header of an encapsulated cell for which an acquiescence has already been received, whenever this is possible. The reception of an acquiescence by a unit indicates to the latter that the unit which sent to it is free to receive so that there is therefore no possibility of one unit being blocked due to congestion caused by the other units.

In the system shown in FIG. 3 the encapsulated cells stored in the buffer memory 20 and 21 are transmitted for sending to buffer modules of the transmit buffer memory 23. These four modules 23A through 23D (FIG. 3) are provided to allow for sending of cells to different units, as and when respective requests from these destination units are received. The encapsulated cells leaving each of the modules 23A through 23D can be transmitted interleaved between encapsulated cells emanating from at least one of the other modules, and are stacked in a module 23E before sending. This prevents delaying sending by a unit of cells addressed to destination units ready to receive them when another destination unit is temporarily unable to receive.

As mentioned above, the encapsulated cells from the transmit buffer modules 23A through 23D can receive in their respective header the elements characteristic of a request or an acquiescence to transmit to the unit to which the encapsulated cell is sent, in which case these elements are supplied by the buffer module 26G in the case of the data characteristic of a request or by a buffer module 26R corresponding thereto in the case of data characteristic of an acquiescence, the two modules 26G and 26R being supervised under the control of the access controller 25.

Requests sent to a unit reach the access control circuit 14 of that unit over the incoming links L1r, L2r which terminate there and are transmitted with the encapsulated cells which contain them to the receive interface 28 of this circuit. The various encapsulated cells received by the receive interface 28 can be taken into account by the parallel buffer memories 27 and 29.

These buffer memories are modular in the system as shown in FIG. 3, the buffer memory 27 being divided into two separate modules 27G and 27R respectively reserved for stacking acquiescences received (memory module 27G) and for stacking requests received (memory module 27R). These stacked acquiescences and these stacked requests may come from various packet mode units of the installation core 1. As mentioned above, the requests are preferably classified, firstly according to the priority assigned to them by the unit which produced them and secondly according to the seniority of their arrival at the module 27R in which they are stacked. As already explained, it is therefore possible for a unit which has previously sent a request for which no acquiescence has as yet been received to send a second request with a higher priority in order to report its increasing congestion and to obtain an acquiescence more quickly.

In parallel with this, the standard cells transmitted by links L1r and L2r to a receive interface 28 are transmitted to one or other of the modules 29A through 29D of the buffer memory 29 without the data that they contain relating to requests and acquiescences.

Each module 29A through 29D can store encapsulated cells from a different sending unit as and when these cells arrive in the stream of encapsulated cells of possibly different origins which are transmitted by the links L1r and L2r to the associated receive interface 28.

The buffer module 29A through 29D chosen to receive an encapsulated cell is therefore selected according to the sending unit address written in the header of this cell by this unit.

The encapsulated cells stored in the same buffer module 29A through 29D are then transmitted (in this example) to one or other of the secondary buffer memories 30 and 31 depending on the "connected" or "connectionless" mode chosen for the packet of which they form part, as indicated by their respective header. The disencapsulation interface 33 of the receiving unit then reconstitutes either the standard cells constituting the elements to enable reconstitution of the initial packet received at the sending unit, or the initial information module, such as a file transmitted in packet mode, at the disencapsulation circuit 32 of the receiving unit, for example for its transmission to the memory, not shown, of the system 15 which is to receive it in the receiving unit.

There is claimed:

1. An asynchronous switching network for a communication installation core including a plurality of packet mode units interconnected by point-to-point links identically designed and operated, said network comprising a traffic control system including access control means in each of said packet mode units for setting the communication order of data packets sent to a receiving one of said packet mode units from others of said packet mode units, each of said data packets containing a plurality of packet elements, transmission of one of said data packets from a sending one of said packet mode units to said receiving one of said packet mode units requiring the sending in one direction of a request by said sending one of said packet mode units to said receiving one of said packet mode units with which said sending one of said packet mode units is required to communicate, and the sending of an acquiescence in the reverse direction from said one direction for each of said plurality of packet elements separately transmitted between said sending one and said receiving one of said packet mode units.

2. The asynchronous switching network according to claim 1, wherein:

each of said plurality of packet elements separately transmitted between said sending one and said receiving one of said packet mode units is a fixed size encapsulated cell;

said encapsulated cell has a header for transmission within said communication installation core between said packet mode units;

said traffic control system further comprises request sending means in each of said packet mode units for sending individual requests from each of said packet mode units by insertion of specific request data into the header of said encapsulated cell sent from said sending one of said packet mode units; and each said request sent in said encapsulated cell header includes a priority indication supplied by said sending one of said packet mode units.

3. The asynchronous switching network according to claim 2, wherein:

said traffic control system further comprises send storage means in each of said packet mode units for temporarily storing encapsulated cells to be sent and optionally for dissociating the encapsulated cells relating to "connected" mode traffic, implying transmission between said packet mode units with given time constraints from those relating to "connectionless" mode traffic with less severe constraints.

4. The asynchronous switching network according to claim 3, wherein said traffic control system further comprises temporary send storage means in each of said packet mode units for storing, in separate stacks, requests and acquiescences to be sent to said others of said packet mode units.

5. The asynchronous switching network according to claim 3, wherein said header of the encapsulated cells comprises header elements including the requests and the acquiescences, said traffic control system further comprises temporary receive storage means in each one of said packet mode units for separately recovering the respective requests and acquiescences sent to said each one of said packet mode units in the encapsulated cell headers that said each one of said packet mode units receives from said others of said packet mode units, and other header elements of the received encapsulated cells.

6. The asynchronous switching network according to claim 5, wherein additional storage means are associated with the temporary storage means in each of said packet mode units for storing, in separate stacks, the elements of encapsulated cells received relating to "connected" mode traffic and those relating to "connectionless" mode traffic.

7. An asynchronous switching network according to claim 3, wherein said header of the encapsulated cells comprises header elements including the requests and the acquiescences, said traffic control system further comprises temporary receive storage means in each one of said packet mode units for separately recovering the requests and acquiescences, sent to said one of said packet mode units in the header of the encapsulated cells that said one of said packet mode units receives from said others of said packet mode units, and other header elements of the received encapsulated cells, wherein said send storage means and said temporary receive storage means are respectively divided into a plurality of parallel modules to enable separate storage of encapsulated cells according to the packet mode units to which said cells are respectively addressed and to authorize interleaved transmission of encapsulated cells either sent to different destination packet mode units or received from different sending packet mode units.

8. The asynchronous switching network according to claim 1, wherein all of said packet mode units each have two bidirectional links, each of said two bidirectional links are separately connected to one of a first and a second broadband switching unit, all the packet mode units are connected to said first and said second broadband switching unit for point-to-point communication therebetween via at least one of said first and said second broadband switching unit.

* * * * *